United States Patent [19]

Hartwig

[11] Patent Number: 4,758,132

[45] Date of Patent: Jul. 19, 1988

[54] ROTARY MACHINE WITH MOTOR EMBEDDED IN THE ROTOR

[75] Inventor: Carl S. M. Hartwig, Täby, Sweden

[73] Assignee: Institut Cerac S.A., Ecublens, Switzerland

[21] Appl. No.: 934,017

[22] Filed: Nov. 24, 1986

[30] Foreign Application Priority Data

Nov. 25, 1985 [CH] Switzerland .................. 5027/85

[51] Int. Cl.⁴ .................. F04B 17/00; H02K 5/00
[52] U.S. Cl. .................. 417/353; 417/410; 418/179; 418/201; 310/67; 310/87
[58] Field of Search .......... 417/410, 352, 353, 355, 417/356, 348, 338; 418/201, 179; 310/67, 87

[56] References Cited

U.S. PATENT DOCUMENTS

| | | | |
|---|---|---|---|
| 1,780,339 | 11/1930 | Canton | 417/410 |
| 2,161,374 | 6/1939 | Moineau | 417/410 X |
| 2,557,879 | 6/1951 | Lewis et al. | 417/353 |
| 2,640,428 | 6/1953 | Houghton | 417/338 |
| 2,871,793 | 2/1959 | Michie et al. | 417/356 |
| 3,558,246 | 1/1971 | Philipp | 418/179 X |

FOREIGN PATENT DOCUMENTS

| | | | |
|---|---|---|---|
| 1315645 | 12/1962 | France | 417/356 |
| 2123089 | 1/1984 | United Kingdom | 417/338 |

Primary Examiner—Carlton R. Croyle
Assistant Examiner—Theodore Olds
Attorney, Agent, or Firm—Eric Y. Munson

[57] ABSTRACT

A rotary machine having two meshing rotors (14,15) rotatable in intersecting bores (12,13). The bore walls are provided with a number of electrical windings (18,19) being stator windings of an electric motor in which the pump rotors (14,15) are the rotors of the electric motor. The electrical windings are connected to an inverter which creates rotating magnetic fields which rotate the rotors.

10 Claims, 5 Drawing Sheets

ROTARY MACHINE WITH MOTOR EMBEDDED IN THE ROTOR

The present invention relates to a rotary machine of the type where two rotors are provided for rotation in two intersection bores in a housing. The machine can be used either as a rotary pump driven by the integrated electric motor or be used as an expander driving an integrated electric generator.

In prior art rotary pumps of the above kind, e.g. Roots blowers or screw compressors, the rotors are driven by an external motor connected to a rotor shaft extending through the housing wall. This makes is necessary to arrange seals to avoid leakage along the driving shaft.

The present invention aims at creating a rotary machine which does not have any shaft extending through the housing wall and which is comparatively compact because the electric part of the machine is integrated with the other parts of the machine. An advantage with the present invention is that both rotors can be driven without synchronizing gears so that the contact pressure between the rotors can be kept low. By control of the current in the stator windings of each rotor the contact pressure between the rotors can be controlled.

Two embodiments of the invention are described below with reference to the accompanying drawings in which FIG. 1 is a cross section through a first embodiment of the invention.

Figure 5:
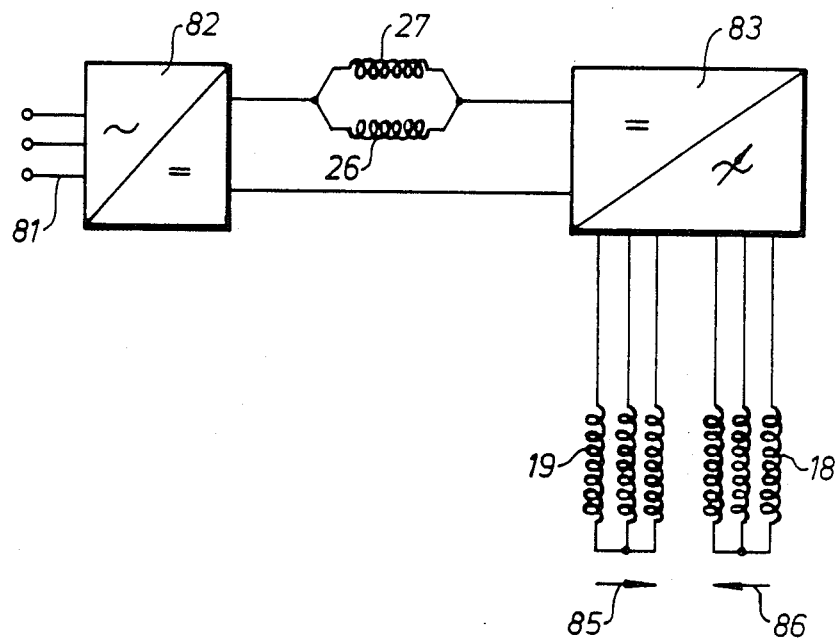

FIG. 5 schematically shows the electrical wiring of the drive.

Figure 6:
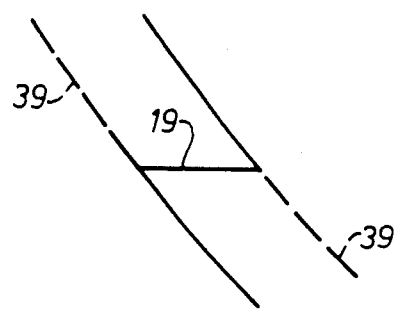

FIG. 6 shows an example of the physical layout of one winding.

Figure 1:
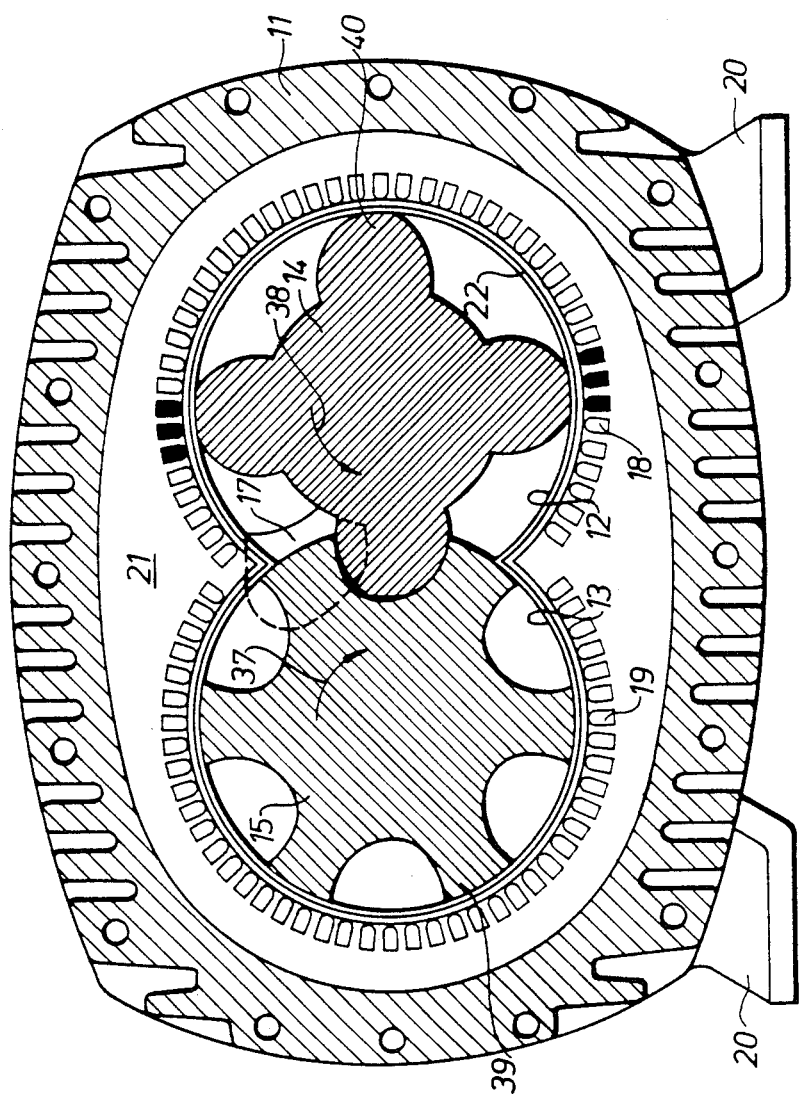
Figure 2:
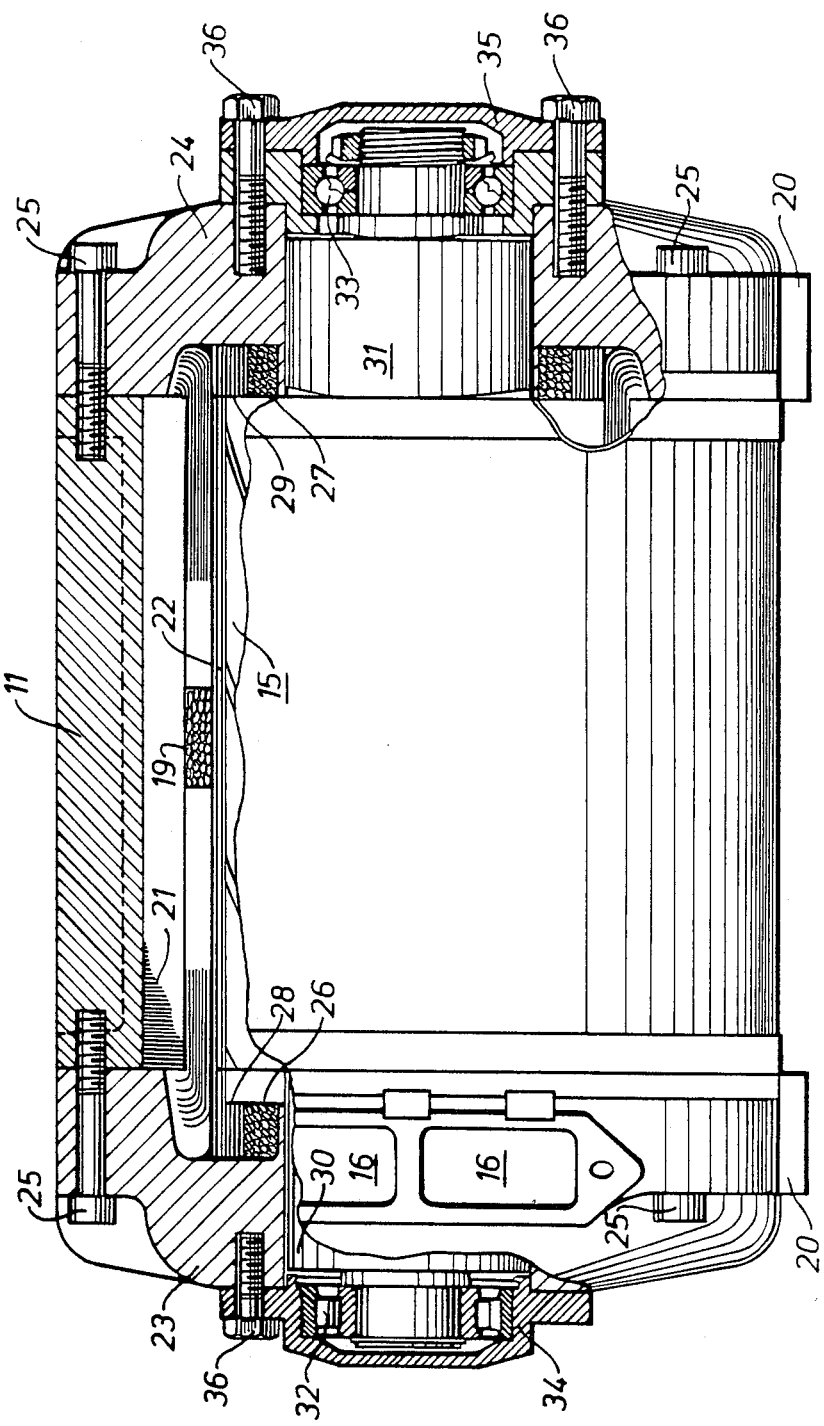
FIG. 2 is a longitudinal view, partly in section, of the rotary pump of FIG. 1.

The rotary pump shown in FIGS. 1 and 2 is a screw compressor comprising a housing 11 provided with two intersecting bores 12,13. Two rotors 14,15 provided with lobes 40,39 are rotatable in these bores and mesh with one another so that a working fluid can be pumped from inlet or low pressure openings 16 to an outlet or high pressure opening 17. The rotors are intended for rotation in the directions indicated by arrows, 37,38. The housing is provided with end pieces 23,24 which are connected with the central part 11 by means of screws 25. The end pieces are provided with feet 20 for carrying the machine. Housing 11 is further provided with a number of radially directed thin metal plates 21 as indicated in FIG. 2. These plates are insulated from one another. A number of electrical windings 18,19 are provided in the walls of bores 12,13 and connected to an electric supply as described below. The windings are covered by a thin layer 22 of a nonmagnetic material having high resistivity. The rotors are provided with extensions 30,31. Magnetizing windings 26,27 are provided in the end pieces about the extension. Rings 28,29 of nonmagnetic material having high resistivity are provided about the magnetizing windings. The rotors are journalled in bearings 32,33. The housing is provided with sealing covers 34,35 which are mounted by means of screws 36. The operation of the above described rotary pump is described below in connection with FIGS. 5 and 6.

Figure 3:
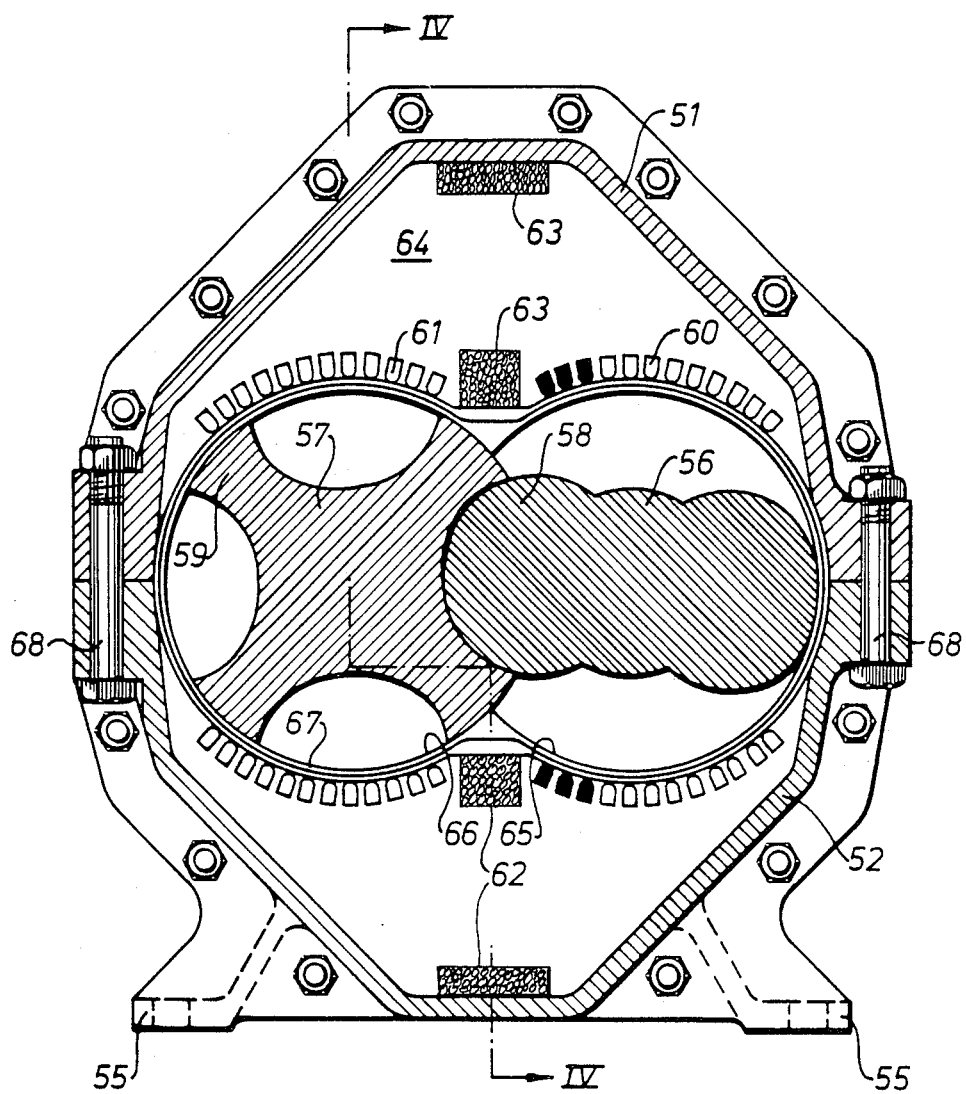
FIG. 3 is a cross section of a second embodiment of the invention.
Figure 4:
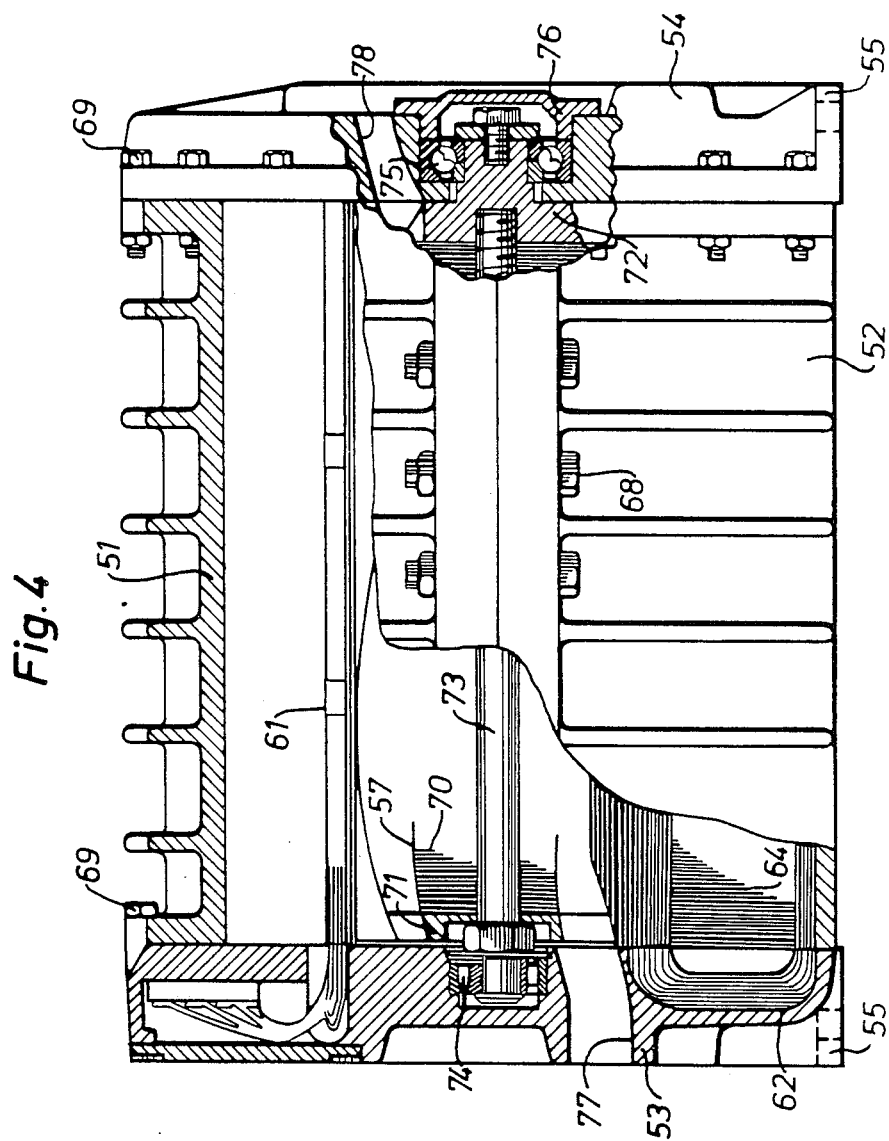
FIG. 4 is a longitudinal view, partly in section according to 4—4 in FIG. 3, of the rotary pump of FIG. 3.

The embodiment of the invention shown in FIGS. 3 and 4 is also a screw compressor comprising a housing 51,52 having end pieces 53,54 connected to housing parts 51,52 by means of screws 69. Housing parts 51,52 are held together by screws 68. End pieces 53,54 are provided with feet 55 for supporting the rotary pump. The housing is provided with a number of thin metal plates 64 as shown in FIG. 4. These plates are insulated from one another. Two intersecting bores 65,66 are arranged through the metal plates 64. Rotors 56,57 provided with lobes 58,59 are arranged for rotation in the bores the walls of which are covered by a thin layer 67 of nonmagnetic material having high resistivity. The rotors are made of a number of thin metal plates 70 which are insulated from one another. These plates are held together between end parts 71,72 by a screw 73. The rotors are journalled in bearings 74,75. The housing is provided with a sealing cover 76. The rotors mesh with one another to pump a working fluid from an inlet opening 77 to an outlet opening 78. The walls of bores 65,66 are provided with electric windings 60,61 which are connected to an electric pump to be sequentially energized to create a rotating magnetic field in each bore by which the rotors are rotated. The housing is also provided with two magnetizing windings 62,63 connected to a direct current supply by means of which a magnetic field is created such that the rotors will rotate with speeds which are synchronous with the speeds of the rotating magnetic fields. The speeds of the two rotating magnetic fields must be adapted relative to one another so that the number of lobes on either rotor are taken into account. This is preferably done by arranging the windings in the two bores so that a common inverter can be used to create the two rotating magnetic fields. Instead of the magnetizing windings the rotor lobes may be provided with permanent magnets at their crests. Windings 60,61 are arranged helically along the housing to corresponding to the pitch angles of the rotors. Since the wrap angles of the rotors are too large the individual windings should be arranged as described in connection with FIG. 6. It is also possible to operate without magnetizing windings or permanent magnets. The machine will then operate as a reluctance synchronous motor.

The electric drive, schematically shown in FIG. 5, comprises a controlled rectified bridge which is connected to a network 81. The rectifier bridge delivers a variable voltage which is supplied to an inverter 83 via a filter 26,27. The coils 26,27 are the magnetizing windings of the synchronous motor. The inverter feeds the stator windings 18 and 19 such that two rotating magnetic fields are created to rotate in opposite directions as indicated by arrows 85,86. The windings of the two bores can suitably be arranged such that a number of poles corresponding to the number of lobes of respective rotor is obtained. In this way the two rotors will obtain suitable speeds while the two windings 18,19 are supplied with voltage of the same frequency. If the rotary pump has magnetizing windings as shown in the drawings or if the lobes are provided with permanent magnets at their crests it is possible to use a very simple inverter because the magnetic field will induce voltages in the stator windings which turn off the switching elements. If, on the other hand, the pump operates as a reluctance synchronous motor the inverter must be force commutated. In this case considerably more components are required.

In the embodiment of the invention shown in FIGS. 1 and 2 the magnetizing windings 26,27, each comprising two coils because there are two rotors, are connected such to the voltage supply that the created magnetic fluxes are directed either toward each other or from each other. In the former case the flux moves from coil 27 into the rotor where it turns and leaves the rotor radially through the lobes. The flux then passes radially through the thin metal plates 21. The flux is then turned back to the coil through housing part 11, end piece 24 and extension 31. The flux at the other end of the rotor is a mirror image.

In the embodiment shown in FIGS. 3 and 4 the two magnetizing windings 62,63 are connected such to the voltage supply that a magnetic flux being either clockwise or counterclockwise as seen in FIG. 3 is created. Since the rotors are helical there will always be parts of the rotor lobes that are close to the thin metal plates 64 so that the magnetic flux can easily enter and leave the rotors.

In FIG. 6 a plan view of the layout of a single winding is shown. Since the rotary pumps shown are screw compressors having large wrap angles the individual winding 19 which extends helically along the housing with a pitch angle corresponding to that of the rotor lobes 39 suitably extends along two or more neighboring lobes so as not to interfere with the meshing region of the two rotors.

I claim:

1. A rotary machine comprising a housing (11) provided with two intersecting bores (12,13), one rotatable lobed rotor (14,15) in each bore, said rotors meshing with one another and arranged for pumping a working fluid from a low pressure opening (16) to a high pressure opening (17) or for being driven by a working fluid, characterized in that a number of electrical windings (18,19) are provided in the wall of each bore, that an inverter is connected to said windings to sequentially energize the windings of each bore wall to create a rotating magnetic field in each bore, whereby said rotors (14,15) are rotated or to generate a voltage when the rotors are rotated by the working fluid, and in that the rotor lobes (39, 40) extend helically about the axis of the rotor and that the electrical windings (19, 18) in the walls of the bores (12, 13) have a pitch angle corresponding to the pitch angle of the lobes of respective rotor.

2. A rotary machine according to claim 1, characterized in that a magnetizing winding (26,27) is provided about an extension (30,31) at either end of said rotors (14,15) and that said magnetizing windings are connected to a direct current supply (82) to create a magnetic flux between said rotor lobes (39,40) and the housing (11).

3. A rotary machine according to claim 1, characterized in that the housing comprises a number of thin metal plates (21) which are perpendicular to the rotational axes of the rotors (14,15), said metal plates being insulated from one another and said bores (12,13) extending through the metal plates (21).

4. A rotary machine according to claim 1, characterized in that the housing comprises a number of thin metal plates (64) which are perpendicular to the rotational axes of the rotors (56,57), said metal plates being insulated from one another, said bores 965,66) extending through the metal plates (64), one magnetizing winding (62,63) being provided on either side of said intersecting bores (65,66) and that said magnetizing windings are connected to a direct current supply (82) to create a magnetic flux passing through the two rotors (56,57) substantially perpendicularly to the rotor axes.

5. A rotary machine according to claim 1, characterized in that the rotors (56,57) comprise a number of thin metal plates (70) being insulated from one another.

6. A rotary machine according to claim 1, characterized in that the walls of each bore (12,13) are covered by a thin layer (22) of a nonmagnetic material having high resistivity.

7. A rotary machine according to claim 2, characterized in that the walls of each bore (12,13) are covered by a thin layer (22) of a nonmagnetic material having high resistivity.

8. A rotary machine according to claim 3, characterized in that the walls of each bore (12,13) are covered by a thin layer (22) of a nonmagnetic material having high resistivity.

9. A rotary machine according to claim 4, characterized in that the walls of each bore (12,13) are covered by a thin layer (22) of a nonmagnetic material having high resistivity.

10. A rotary machine according to claim 5, characterized in that the walls of each bore (12,13) are covered by a thin layer (22) of a nonmagnetic material having high resistivity.

* * * * *